Figures 1, 2:
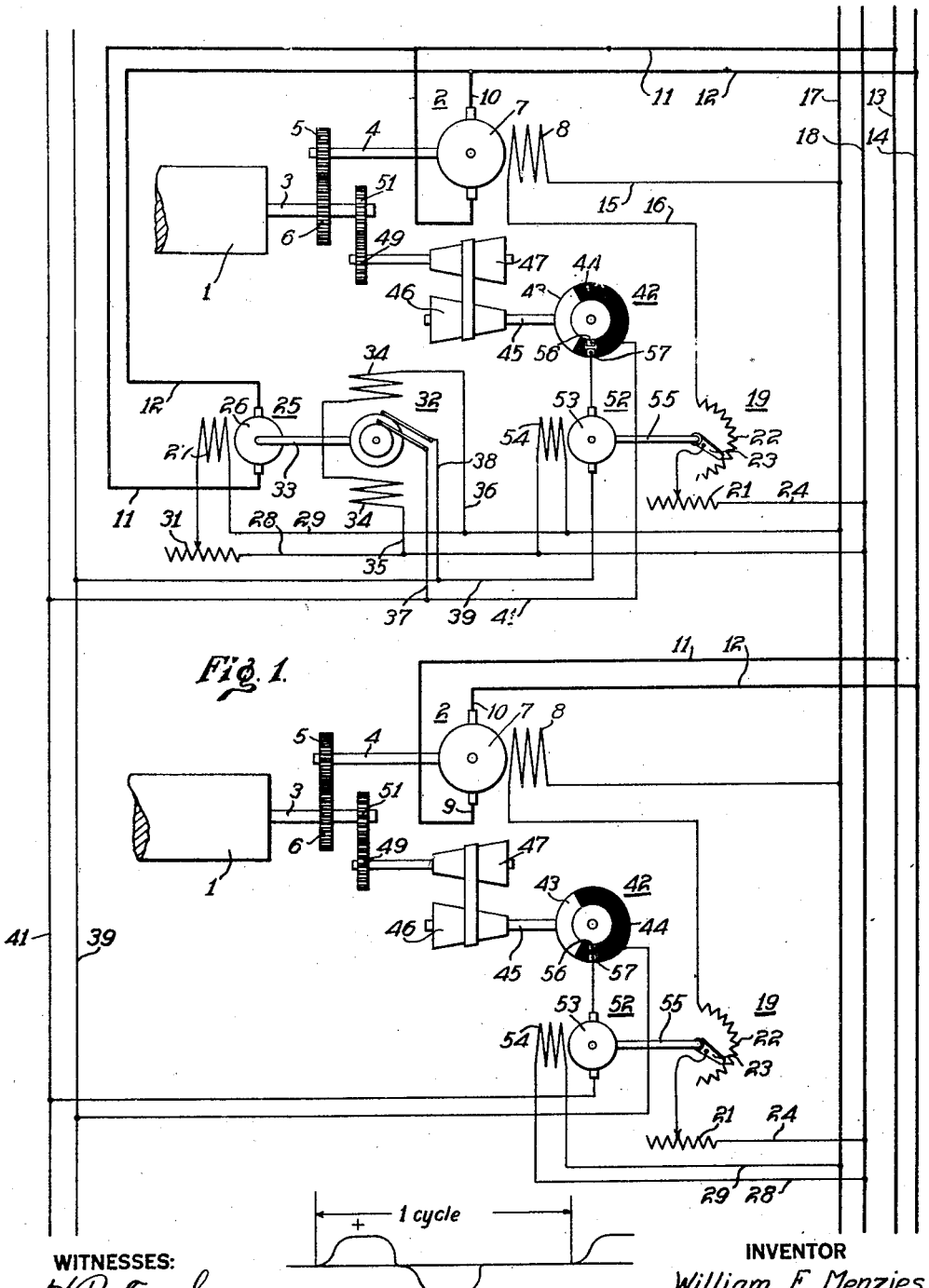

July 31, 1928.  
W. E. MENZIES  
REGULATOR SYSTEM  
Filed June 14, 1923

1,678,868

WITNESSES:  
H. B. Funk  
J. E. Hardy

INVENTOR  
William E. Menzies  
BY  
Wesley G. Carr  
ATTORNEY

Patented July 31, 1928.

1,678,868

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed June 14, 1923. Serial No. 645,278.

My invention relates to regulator systems and more particularly to regulator systems for maintaining a number of machines at definite relative speeds that are variable at will.

One object of my invention is to provide a regulator system that shall govern the speeds of a number of motors and that shall maintain a substantially constant speed ratio between them.

Another object of my invention is to provide a regulator system of the above-indicated character in which the amount of correction upon each motor is directly proportional to its angular displacement from normal with respect to a master-speed reference means.

A still further object is to provide a system of the class under consideration in which a convenient interval of time is introduced between the periods of correction to prevent overtravel of the speed-correcting means and thus prevent hunting action of the controlled motor.

In many industrial applications it is desirable to operate a number of rotating members at a constant speed or to maintain a constant speed ratio between a number of moving parts; thus, in the case of paper-making machines it is necessary that the speed ratio between various sets of paper rolls be maintained constant in order to prevent breaking the paper.

In a regulator system constructed in accordance with my invention as applied to a paper-making machine, each set of paper rolls is individually motor driven and the various motors are so controlled as to maintain a substantially constant speed ratio between them. Means are provided whereby the ratio between the various rolls may be varied at will.

In the accompanying drawing, Figure 1 is a diagrammatic view of a system of control arranged in accordance with my invention for maintaining a plurality of machines at definite relative speeds and at the same time affording convenient means for varying the speed relation.

Fig. 2 illustrates approximately the wave form of a master alternator used to control the speed of the system.

With reference to the accompanying drawing, a number of paper rolls 1, only two of which are illustrated for the sake of simplicity, are individually driven by main or section motors 2 by means of shafts 3 and 4 and co-operating gear-wheels 5 and 6. The several sets of rolls being similar, only one set will be described. The section motor 2 comprises an armature 7 and a field winding 8. The armature 7 is connected by means of conductors 9 and 10 to conductors 11 and 12, which are in turn connected to variable-voltage supply conductors or bus bars 13 and 14. The field winding 8 is connected by means of conductors 15 and 16 to constant-voltage supply conductors or bus bars 17 and 18. One side of the field circuit 16 is connected through a pilot-motor-operated rheostat 19, a manually variable resistor 21 and conductor 24 to bus bar 18. Rheostat 19 comprises a variable resistor 22 and an operating arm 23.

A master motor 25, comprising an armature 26 and a field winding 27, has its armature connected to the conductors 11 and 12 that are connected to the variable voltage supply conductors 13 and 14. The field winding 27 of the motor 25 is connected by means of conductors 28 and 29 to the constant-voltage supply conductors or bus bars 17 and 18. In one side of the field circuit 28 is connected a manually operative variable resistor 31.

The master motor 25 drives a master alternator or alternating-current generator 32 by means of a shaft 33. A field winding 34 of the alternator is connected by conductors 35 and 36 to the conductors 28 and 29, which are supplied with current from the constant-potential bus bars 17 and 18.

The generated current of the alternator 32 is conducted by means of leads 37 and 38 to conductors 39 and 41, which constitute a control circuit from which the several pilot motors hereinafter described are operated. Associated with each paper roll 1 is a rotary contactor 42, which is driven by means of a shaft 45, cone pulleys 46 and 47 and co-operating gear-wheels 49 and 51, in accordance with the speed of the associated paper roll. The rotary contactor 42 comprises a conducting segment 43 and a non-conducting segment 44, and is provided with brushes 56 and 57 that are adapted to engage these segments. The conducting commutator segment 43 extends for substantially one-third of the operative cycle of the commutator.

A pilot motor 52, which is provided with an armature 53 and a field winding 54, actuates the arm 23 of the rheostat 19 by means of a shaft 55. The field winding 54 of the pilot motor is connected to conductors 28 and 29, which are supplied with constant-potential current from the bus bars 17 and 18. The armature 53 of the pilot motor has one of its terminals connected to the above-mentioned control circuit conductor 39 and the other terminal connected to brush 57, which engages the rotary contactor 42. Brush 56, which also engages the rotary contactor 42, is connected to conductor 41 constituting the other conductor of the control circuit. Since a reversal of the direction of current flow in either the field winding or the armature winding of pilot motor 52 would reverse the direction of rotation of the motor, the armature and field connections might be interchanged thus controlling the motor by modifying the field current.

The alternator 32 is a slow-speed single-phase alternator having a wave form as illustrated in Fig. 2 of the drawing, that is, having zero voltage during substantially one-third of the cycle and similar positive and negative waves, approaching a rectangle in form, during the other portions of the cycle.

It will be seen that if the speed of the rotary contactor 42 corresponds to or synchronizes with that of the alternator 32, and its phase relation or angular position with respect to the alternator is such that the conducting segment 43 passes under the brushes 56 and 57 during the interval of zero voltage of the alternator, no current will flow in the control circuit through the corresponding pilot motor 52. If, however, the speed of the rotary contactor 42 varies with respect to the speed of the alternator, so as to produce a difference in the synchronous or phase relation between the two rotating members, the conducting segment 43 will pass under the brushes 56 and 57 during a portion of a positive or a negative wave of the alternator. Should the variation from normal be such that the conducting segment 43 passes under the brushes 56 and 57 during a negative wave of the alternator, the pilot motor 52 will be operated in one direction of rotation. Should the conducting segment 43 pass under the brushes 56 and 57 during a positive wave of the alternator, the pilot motor 52 will be operated in the opposite direction of rotation.

It will be seen, therefore, that by properly connecting the rheostat 19 in the field circuit of the section motor 2, and arranging the proper direction of rotation of the pilot motor 52, as the section motor 2 tends to increase its speed with relation to the master alternator 32, current will be caused to flow in the control circuit operating the pilot motor 52 and rheostat 19 in a direction to counteract this change of speed, and should the section motor 2 tend to decrease its speed from normal with respect to the master alternator 32, the pilot motor 52 will be likewise operated in a direction tending to bring the speed of section motor 2 back to normal.

It will be apparent from a study of the disclosure that the length of time, or the portion of any cycle of the alternator, during which current will flow through the pilot motor, will depend upon the degree of phase displacement between the corresponding section rotary contactor 42 and the master alternator 32. It will also be apparent that the flow of current through the pilot motor 52 will be of an intermittent character, thus causing a gradual step-by-step operation of the pilot motor and thereby preventing overtravel.

Cone pulleys 46 and 47 serve as means for varying the permanent speed relation between the several section motors and the master alternator. By a proper adjustment of cone pulleys for each section, the several sets of rolls of a paper making machine may be operated at progressively increasing speeds to accommodate the elongation of the stock during the rolling process. While only two sets of rolls are illustrated, it is obvious that any number of sets may be regulated by a single master alternator.

The above-described structural details are diagrammatically shown, serving only to illustrate the principles of operation of the system. Various modifications in the system and in the arrangement and location of parts may be made within the spirit and scope of my invention, and such modifications are intended to be covered by the appended claims.

I claim as my invention:

1. In a regulator system, a motor to be regulated, pilot motor means for varying the excitation of said motor, and means for energizing said pilot motor means comprising an alternating-current generator and rotary contactor means actuated in accordance with the speed of said motor, said generator and said rotary contactor means cooperating to energize said pilot motor means upon a variation in the speed of said motor from normal, and to control the direction of rotation of said pilot motor means in accordance with the direction of said variation from normal.

2. In a regulating system, a motor to be regulated, pilot motor means for varying the excitation of said motor, a master speed-reference means, and means for energizing said pilot motor means comprising an alternating-current generator driven in accordance with the speed of said master speed-reference means and cooperating rotary contactor means actuated in accordance with the speed of said motor and adapted to energize said pilot motor means upon a variation in the speed of said motor from normal.

3. In a regulating system, a section motor to be regulated, pilot motor means for varying the excitation of said section motor, a master speed-reference means, and means for energizing said pilot motor means comprising an alternating-current generator driven in accordance with the speed of said master speed-reference means and cooperating rotary contactor means actuated in accordance with the speed of said motor, said rotary contactor having a conducting segment and a non-conducting segment for determining the direction of rotation of said pilot motor means in accordance with variations in speed between said generator and said rotary contactor.

4. In a regulating system, a control circuit comprising an alternating-current generator and a pilot motor armature, and a rotary contactor adapted to complete said circuit during the zero voltage period of the alternator when rotated in synchronism with said alternator, and for determining the direction of current in said circuit when rotated out of synchronism with said alternator.

5. In a regulating system, a control circuit comprising an alternator, a pilot-motor armature and a rotary contactor, said alternator having a wave form comprising similar positive and negative waves and a zero voltage period, said rotary contactor being adapted to complete said circuit during the zero voltage period of the alternator when rotated in synchronism with said alternator, and to complete said circuit during a positive or negative wave period of said alternator when its speed of rotation varies from that of synchronism with said alternator.

6. In a regulating system, a motor to be regulated, a rotary contactor driven in accordance with the speed of said motor, master speed-reference means comprising an alternator, electro-responsive control means, and a control circuit from said alternator intermittently closed by said rotary contactor through said electroresponsive means for gradually varying the excitation of said motor, said alternator and said rotary contactor cooperating to arrest the flow of current in said circuit when the speed of said motor remains normal and to determine the direction of flow of current in said circuit in accordance with the direction of speed variation of said motor from normal, and to control the duration of current flow in accordance with the degree of speed variation from normal.

7. In a regulator system, a motor to be regulated, a master speed-reference means comprising an alternator, means actuated by said alternator, and responsive to speed variation between said motor and said alternator for gradually varying the excitation of said motor and comprising a rotary contactor driven by said motor, and means for varying the permanent speed relationship between said motor and said alternator.

8. In a regulator system, the combination with an electric motor and a separate speed member, of means responsive to speed variation between the motor to be regulated and the speed member for gradually varying the excitation of the motor, said means comprising an alternator associated with the separate speed member and a rotary contactor for the motor to be controlled, and additional means for varying the permanent speed relationship between said motor and said speed member.

9. In a regulator system, the combination with an electric motor and a separate speed member, of means responsive to speed variation between the motor to be regulated and the speed member for gradually varying the excitation of the motor, said means comprising an alternator associated with the separate speed member and a rotary contactor for the motor to be controlled, and electro-responsive means for varying the resistance of the field circuit of said motor, and additional means for varying the permanent speed relationship between said motor and said speed member.

10. In a regulator system, a motor to be regulated, electroresponsive means for varying the excitation of said motor, a master speed-reference means, and means for controlling said electroresponsive means comprising a generator driven in accordance with the speed of said master speed-reference means and a rotary contactor driven in accordance with the speed of the motor to be controlled.

11. In a regulator system, the combination with a plurality of rolls, a section motor connected to each of said rolls, and a rotary contactor operated by each motor, of a pilot motor associated with each of said section motors to vary the excitation thereof, and master speed reference means cooperating with said rotary contactors for controlling said pilot motors to maintain a constant speed ratio between the various rolls, said master speed-reference means comprising an alternating-current generator.

12. In a regulator system, the combination comprising a plurality of main motors, a pilot motor for varying the excitation of each main motor, a common source of alternating current for energizing said pilot motors, and means actuated in accordance with the speed of each main motor for intermittently interrupting the energization of the corresponding pilot motor and for determining the direction of such energization.

13. In a regulating system, a pilot-motor control circuit comprising an alternating-current generator, a pilot-motor armature, and a rotary contactor having a conducting segment and a non-conducting segment, said generator and said rotary contactor cooperatively determining the direction and degree of energization of said pilot motor.

14. In a regulating system, a control circuit comprising an alternating-current generator, a pilot motor, and a rotary contactor comprising a conducting segment and a non-conducting segment, said rotary contactor being adapted to intermittently interrupt said circuit and to determine the direction of current flow through said pilot motor in accordance with the phase relation of said contactor with respect to said generator.

In testimony whereof, I have hereunto subscribed my name this 6th day of June, 1923.

WILLIAM E. MENZIES.